US012055082B2

(12) United States Patent
Charollais et al.

(10) Patent No.: US 12,055,082 B2
(45) Date of Patent: Aug. 6, 2024

(54) PROCESS CONSISTING IN COOLING AT LEAST ONE COMPONENT, SUCH AS A SENSOR, ARRANGED WITHIN A COMPARTMENT OF AN EXHAUST AFTER TREATMENT SYSTEM OF A VEHICLE

(71) Applicant: VOLVO LASTVAGNAR AB, Gothenburg (SE)

(72) Inventors: David Charollais, Mions (FR); Denis Fontrobert, Mornant (FR)

(73) Assignee: VOLVO LASTVAGNAR AB, Gothenburg (SE)

( * ) Notice: Subject to any disclaimer, the term of this patent is extended or adjusted under 35 U.S.C. 154(b) by 0 days.

(21) Appl. No.: 16/638,577

(22) PCT Filed: Oct. 3, 2017

(86) PCT No.: PCT/EP2017/075074
§ 371 (c)(1),
(2) Date: Feb. 12, 2020

(87) PCT Pub. No.: WO2019/068313
PCT Pub. Date: Apr. 11, 2019

(65) Prior Publication Data
US 2020/0224567 A1     Jul. 16, 2020

(51) Int. Cl.
*F01N 3/00*  (2006.01)
*F01N 3/025* (2006.01)
(Continued)

(52) U.S. Cl.
CPC .............. *F01N 3/0253* (2013.01); *F01N 3/05* (2013.01); *F01N 9/002* (2013.01); *F01N 2260/022* (2013.01)

(58) Field of Classification Search
CPC .......... F01N 3/0253; F01N 3/05; F01N 9/002; F01N 2260/022; F01N 2560/00
See application file for complete search history.

(56) References Cited

U.S. PATENT DOCUMENTS 4,061,117 A * 12/1977 Ikeura ................. F02D 41/1494
                                                        123/681
4,231,717 A * 11/1980 Onishi ..................... F02G 5/02
                                                        417/364
(Continued)

FOREIGN PATENT DOCUMENTS

EP     2891570 A1    7/2015
JP     H0494409 A    3/1992

OTHER PUBLICATIONS

International Search Report and Written Opinion in corresponding International Application No. PCT/EP2017/075074 mailed Dec. 15, 2017 (11 pages).

*Primary Examiner* — Matthew T Largi
(74) *Attorney, Agent, or Firm* — Venable LLP; Jeffri A. Kaminski

(57) ABSTRACT

The invention relates to a process, consisting in cooling at least one component, such as a sensor, arranged within a compartment of an exhaust after treatment system of a vehicle. The exhaust after treatment system comprises a cooling system that is activated during active regeneration of one or more particulate filters arranged within the exhaust after treatment system compartment and that includes a pipe, for blowing fresh air on the component to be cooled or for extracting hot air present at the vicinity of the component to be cooled, so that said component is protected as a priority against high temperatures during active regeneration periods.

21 Claims, 3 Drawing Sheets

(51) Int. Cl.
*F01N 3/05* (2006.01)
*F01N 9/00* (2006.01)

(56) References Cited

U.S. PATENT DOCUMENTS

| | | | | | |
|---|---|---|---|---|---|
| 5,458,673 | A * | 10/1995 | Kojima | ............... | F01N 13/011 95/11 |
| 5,509,389 | A * | 4/1996 | Oshima | ............... | F02D 41/047 123/406.5 |
| 5,701,735 | A * | 12/1997 | Kawaguchi | ........... | F01N 3/0233 60/274 |
| 5,716,586 | A * | 2/1998 | Taniguchi | ............. | F01N 3/2013 422/173 |
| 5,839,397 | A * | 11/1998 | Funabashi | ............. | E02F 9/0866 415/206 |
| 6,784,574 | B2 * | 8/2004 | Turner | ................... | F02B 63/04 310/58 |
| 8,196,555 | B2 * | 6/2012 | Ikeda | ................... | E02F 9/0866 123/41.49 |
| 8,206,476 | B2 * | 6/2012 | O'Neil Batzold | ...... | F01N 3/055 55/385.3 |
| 8,689,925 | B2 * | 4/2014 | Ajisaka | ................. | B60K 13/04 180/68.2 |
| 9,328,655 | B2 * | 5/2016 | Parikh | .................. | F02B 37/162 |
| 9,587,548 | B2 * | 3/2017 | Minnichsoffer | ...... | F01N 13/008 |
| 10,239,383 | B2 * | 3/2019 | Kuchler | ................. | F01N 13/10 |
| 2005/0160740 | A1 * | 7/2005 | Nakano | ................... | F02C 7/12 60/796 |
| 2009/0288395 | A1 * | 11/2009 | Haeberer | ............. | F01N 3/0871 123/41.31 |
| 2010/0155013 | A1 * | 6/2010 | Braun | ................... | F04D 17/025 165/41 |
| 2010/0186395 | A1 * | 7/2010 | Yang | ........................ | F01N 3/05 60/311 |
| 2011/0072782 | A1 * | 3/2011 | Ozawa | .................. | B01D 46/46 60/273 |
| 2011/0099990 | A1 * | 5/2011 | Lang | ...................... | F01N 13/082 60/320 |
| 2012/0102919 | A1 * | 5/2012 | Smith | ................... | F01N 3/0222 60/273 |
| 2013/0014495 | A1 * | 1/2013 | Mosso | .................. | F01N 13/001 60/311 |
| 2013/0014496 | A1 | 1/2013 | Fogg | | |
| 2013/0291523 | A1 * | 11/2013 | Shah | ........................ | F01P 5/06 60/287 |
| 2013/0306156 | A1 * | 11/2013 | Mueller-Haas | ....... | F01N 3/2066 137/1 |
| 2014/0182963 | A1 * | 7/2014 | Sekiya | ..................... | B60R 3/00 180/309 |
| 2014/0360161 | A1 * | 12/2014 | Arani | .................... | F01N 3/2066 60/273 |
| 2016/0230654 | A1 * | 8/2016 | Shatek | ................... | F01N 13/08 |
| 2016/0325618 | A1 * | 11/2016 | Northrop | ............... | A01D 41/12 |
| 2016/0339763 | A1 * | 11/2016 | Kuchler | ................. | F01M 5/001 |
| 2017/0009636 | A1 * | 1/2017 | Kusaka | ................. | F01N 11/002 |

* cited by examiner

PROCESS CONSISTING IN COOLING AT LEAST ONE COMPONENT, SUCH AS A SENSOR, ARRANGED WITHIN A COMPARTMENT OF AN EXHAUST AFTER TREATMENT SYSTEM OF A VEHICLE

CROSS-REFERENCE TO RELATED APPLICATIONS

This application is a U.S. National Stage application of PCT/EP2017/075074, filed Oct. 3, 2017 and published on Apr. 11, 2019 as WO/2019/068313, all of which is hereby incorporated by reference in its entirety.

The present invention concerns a process consisting in cooling at least one component, such as a sensor, arranged within a compartment of an exhaust after treatment system of a vehicle, in particular of a diesel vehicle.

It is known that, in diesel exhaust, the two compounds that have the most impact on the environment are NOx and particulate matter, which is more commonly called "Soot". Soot is a visible exhaust that is made up of unburned fuel, carbon, and other solid material.

To reduce the harmful emissions from internal combustion engines, it is known to equip the diesel engines with an Exhaust After Treatment System (EATS) placed in the exhaust gas path to process legislated exhaust gas constituents. Such system includes a compartment encasing a Diesel Particulate Filter (DPF) which removes unburned particulates of soot from the exhaust gas. Accordingly, instead of exhausting soot into the atmosphere, the DPF traps the soot, and then uses heat to oxidize it. The soot is periodically regenerated into clean, carbon dioxide gas and water vapor. Periodically, the soot that has built up along the channel walls of the DPF must be removed. This process, which brings to mind self-cleaning ovens, is called "regeneration". Regeneration is an oxidation process that uses heat to remove the soot from the filter. The carbon contained in the filter residues ignite only at a relatively high temperature, which is approximately of 550° C., if there is no catalytic support. Such temperature is only reached when the engine is hot, typically when the engine speed is high.

Two types of regeneration process can be distinguished: passive regeneration and active regeneration. Passive regeneration occurs naturally under steady driving, when the engine achieves the required operating temperature. Under normal highway driving, passive regeneration takes place as the catalyst in the DPF heats up enough to oxidize the soot and turn it into $CO_2$. The process is continual: so, whenever the vehicle reaches its operating temperature, the DPF will begin passive regeneration.

Over time, passive regeneration is not enough to prevent soot from building up in the DPF. This is where active regeneration comes in. Active regeneration consists in introducing a small amount of fuel into the exhaust stream between the turbocharger and the DPF. When the fuel makes contact with the catalyst on the DPF, it generates intense heat, approximately of 600° C., that oxidizes any remaining soot on the ceramic filter. The advantage of active regeneration is that it can be performed under all operating conditions of the engine, and in particular when the vehicle is parked or running at low speed, i.e. when the engine is not sufficiently hot to enable the burning of the accumulated filter residues. With this respect, one speaks of "parked regeneration" and of "moving regeneration at low vehicle speed".

Therefore, the exhaust after treatment system compartment becomes very warm, especially when performing parked regeneration or regeneration at low engine speed. This intense heat impacts the most sensible parts of the system, such as the sensors, that are confined under the heat shields of the EATS. Accordingly, the lifetime of these sensible parts is relatively limited.

The idea is then to equip the EATS with a cooling system for cooling the sensible parts and increasing their lifetime.

With this respect, US 2013/0014496 discloses a cooling system for an EATS. The EATS includes a Selective Catalytic Reduction (SCR) system, pre-SCR components, post-SCR components and an exhaust pipe. The pre-SCR and post-SCR include devices such as regeneration devices, heat sources, oxidation catalysts, diesel oxidation catalysts, diesel particulate filters, etc. The cooling system comprises a fan for generating a cooling air flow and an air conduit that is connected to the fan and that is configured to provide the cooling airflow to the EATS. More precisely, in one embodiment, the air conduit surrounds a reductant line of the EATS, while, in another embodiment, the air conduit delivers the cooling airflow to a valve provided on the reductant line.

The purpose in this document is to cool down the exhaust stream coming from the engine, and not the particular components of the EATS, such as the pre-SCR components and post-SCR components US 2013/0291523 also relates to a SCR system that employ a liquid reductant, referred to Diesel Emission Fluid (DEF), by injecting the DEF into the exhaust stream upstream of the catalytic converter. More specifically, the purpose in this document is to protect the electrical components used to control the DEF injections, such as the injector(s), from the ambient temperatures, which can be as high as 180° C. To this end, US 2013/0291523 teaches to use a fan and an air duct having a first end directed towards the fan and a second end directed at the electrically activated injector. Also, one may install a heat shield between the electrical components used to control the DEF injections and the hot part of the EATS.

US 2014/0360161 discloses a cooling system for an after-treatment module mounted within an enclosure. The cooling system includes a source of forced air, typically a fan, a first air duct configured to direct a portion of the fresh air generated by the fan towards a first component of the after-treatment module, including electronic circuitry mounted atop a Diesel Oxidation Catalyst (DOC) and Diesel Particulate Filter (DPF) system, and a second air duct configured to direct the remaining portion of fresh air towards a second component of the EATS, such as a DEF injector. One drawback is that the construction of the cooling system is such that other components of the EATS are cooled by the blown fresh air, and in particular components that shall remain hot to ensure the regeneration function. Accordingly, cooling cannot be performed during regeneration periods.

It is to these drawbacks that the invention intends to particularly remedy, by proposing a new cooling process that can be operated during active regeneration periods.

To this end, the invention concerns a process according to claim 1.

Thanks to the invention, only the component(s) of the EATS that needs to be protected from the intense heat generated within EATS compartment are cooled, the other components, such as the particulate filters, remain hot to ensure that regeneration is properly conducted. In other words, the process of cooling is performed in a more targeted way, to protect in priority the most sensible parts of the EATS. Accordingly, the lifetime of most sensible parts of the EATS, such as the sensors, is increased and less maintenance is required. The purpose of the process is not to cool down the exhaust pipes or exhaust gases, but to cool sensitive parts near the exhaust channels. Indeed, the exhaust gases temperature must stand very high for the depollution efficiency (regeneration). The difficulty here was to develop a solution to cool a very small area, without cooling the neighbouring part, which must be maintain at high temperature for the depollution.

Further aspects of the process, which are advantageous, but not compulsory, are defined in the claims 2 to 7.

The invention also concerns an exhaust after treatment system according to claim 8.

Further aspects of the system, which are advantageous, but not compulsory, are defined in the claims 9 to 15.

The invention also concerns a vehicle according to claim 16.

The invention will be better understood from reading the following description, given solely by way of two non-limiting examples and with reference to the appended drawings, which are schematic depictions, in which.

Figure 1:
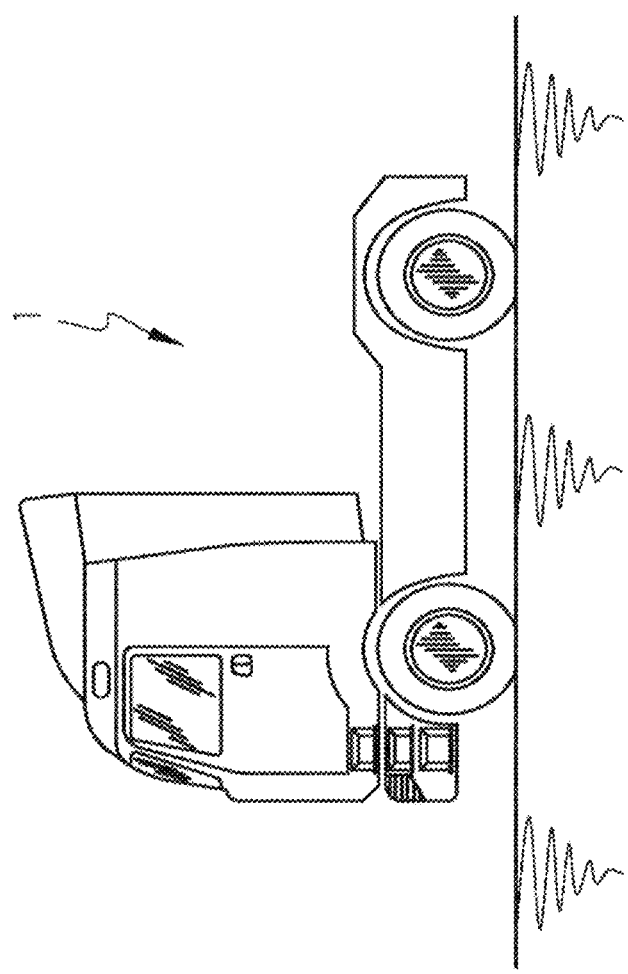
FIG. 1 is a side view of a heavy-duty vehicle, in particular a tractor truck.

FIG. 1 represents, in side view, a vehicle which is, in the example, a tractor truck 1. However, in a non-represented alternative embodiment, the vehicle may be different from a tractor truck. For instance, the vehicle may be a light-duty vehicle, a utility vehicle, an autonomous vehicle, a bus, etc.

The tractor truck 1 includes an Internal Combustion Engine (ICE) 2, preferably a diesel engine, and an Exhaust After Treatment System (EATS) 5 for collecting the exhaust gases of the engine 2 through an exhaust pipe 4. The EATS 5 includes a compartment 6 encasing, among others, a Selective Catalytic Reduction (SCR) system 7 and a Diesel Particulate Filter (DPF) 8 for removing unburned particulates of soot from the exhaust gas. In the example, the compartment 6 is a rectangular box encasing all of the components of the EATS 5. Compartment 6 acts as a heat protective shield, i.e. enables confining the intense heat inside during regeneration periods, in particular during active regeneration periods.

During regeneration of the DPF 8, and in particular during active regeneration periods, the temperature inside compartment 6 is very high. Typically, in the DPF, temperature is often between 550° C. and 650° C. However, some components of the EATS 5 are sensitive to elevated temperatures. This is in particular the case of actuators or sensors, such as the ones used to measure temperature, NOx level or pressure. It is therefore necessary to protect such components from intense heat that is produced during active regeneration periods of the DPF 8. One sensitive component 10, such as a sensor, is represented on FIG. 2.

As a reminder, active regeneration consists in introducing a small amount of fuel into the exhaust pipe 4, i.e. into an exhaust stream of the vehicle engine, upstream of the particulate filter(s) 8. Active regeneration can be initiated at any time, in particular when the vehicle is parked or moving at low speed.

Figure 2:
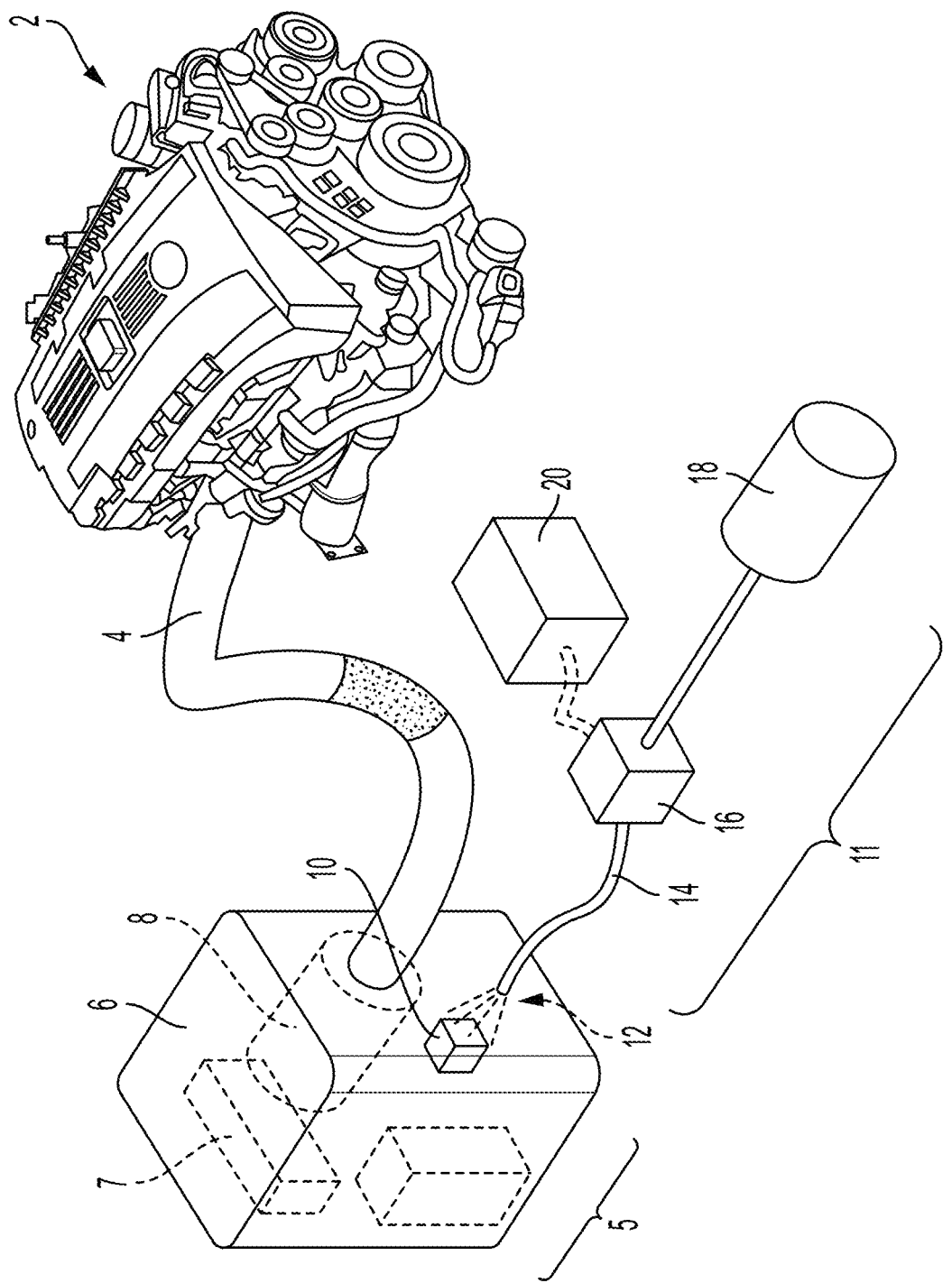
FIG. 2 is a perspective schematic view representing a thermal engine of the vehicle of FIG. 1, together with a first embodiment of an exhaust after treatment system according to the invention.

In order to protect component 10 from intense heat during active regeneration, the EATS 5 comprises a cooling system 11. In the embodiment of FIG. 2, the cooling system 11 includes an air nozzle 12 for each component to be cooled. The air nozzle 12 is oriented towards the component 10 so as to orient the air jet directly onto the component 10. Each air nozzle 12 is connected through an air pipe 14 to a source of compressed air 18, such as an air tank. The air nozzle 12 forms a first end of pipe 14.

Advantageously, the source of compressed air 18 may be common to other air consuming devices of the vehicle, such as the brakes, the suspensions, etc.

Preferably, the cooling system 11 further includes a valve 16 for controlling the air flow inside the pipe 14. Typically, the valve 16 is in an open configuration during active regeneration periods of the DPF 8 and in a closed configuration the rest of the time. In open configuration, air is blown through the nozzle 12 in direction of component 10, while in closed configuration, no air is blown. Accordingly, in this particular example, cooling takes place only during active regeneration periods. The rest of the time, including passive regeneration periods, the cooling system 11 is not activated.

Advantageously, a controller 20 is provided for controlling the opening/closing of the valve 16. In the example, valve 16 is an electrovalve, meaning that it is electronically controlled.

Preferably, the valve 16 is a proportional valve, meaning that the flowrate of blown air can be adjusted during all of the period of active regeneration. By the use of a proportional valve, it is possible to adjust the flowrate between 0% and 100% of a maximum flowrate. Typically, the flowrate can be adjusted by the controller 20 to any percentage of the maximum flowrate. Accordingly, the flowrate of fresh air blown in direction of the component to be cooled 10 can be adjusted. This enables adjusting the flowrate of blown air depending on the pressure level of air inside the air tank. Typically, the flowrate of blown air may decrease proportionally with the pressure in the air tank, meaning that the flowrate is preferably higher when the air tank is full. However, as the pressure in the air tank 18 is permanently maintained by an air compressor between 8 and 12 bar, there is no substantial change in the flowrate.

Figure 3:
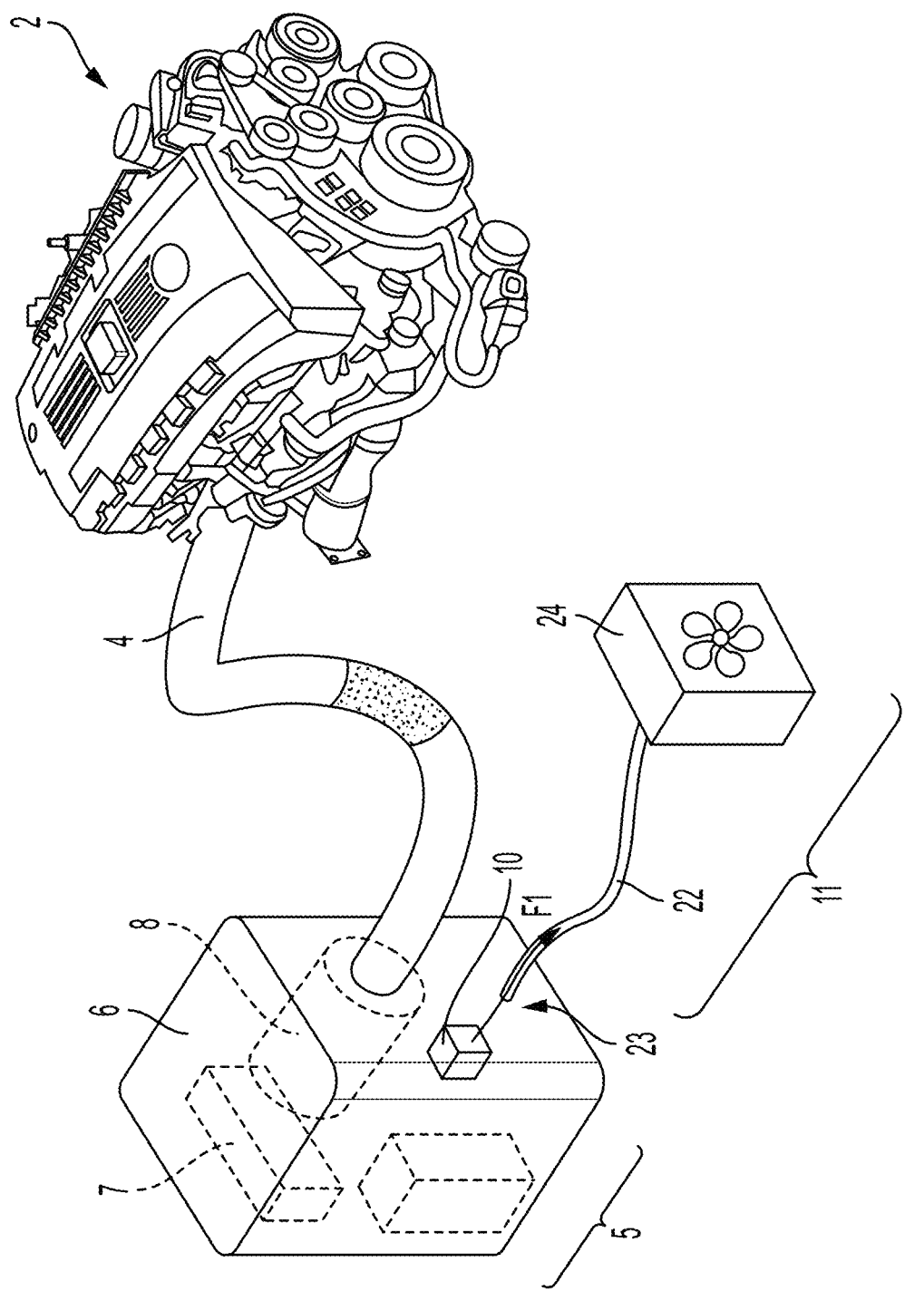
FIG. 3 is a perspective schematic view representing the thermal engine of the vehicle of FIG. 1, together with a second embodiment of an exhaust after treatment system according to the invention.

FIG. 3 represents an alternative embodiment, wherein the cooling system 11 includes a vent pipe 22 for each component to be cooled, in particular one air pipe 22 for the component 10. Advantageously, a first end 23 of the vent pipe 22 is located close to component 10, while a second end (not shown) of the vent pipe 22 is connected to a suction device 24, such as a fan (or fan module). The process then consists, instead of blowing fresh air, in extracting hot air present at the vicinity of the component to be cooled 10. On FIG. 3, the flow of extracted air is represented by arrow F1.

In this particular embodiment, cooling takes place as long as the vehicle engine is on. Alternatively, in an alternative embodiment that is not shown, the suction device 24 may also be controlled to function only during active regeneration periods of the DPF 8. In this particular embodiment, a controller, such an electronic control unit, is provided for controlling the activation of the suction device 24.

In another non-represented alternative embodiment, a controller, such an electronic control unit, may also be provided for controlling the suction force generated by the suction device 24. In particular, the cooling system may include a speed controller (not represented) for controlling the rotation speed of the fan. This enables controlling the flowrate of hot air extracted at the vicinity of each component to be cooled and provides the advantage of adjusting the flowrate depending on the cooling needs reflected by the measures taken by the different sensors located in the EATS, or depending on the cooling system efficiency needs.

Another embodiment that could enable to adjust the flowrate is the use of a valve (e.g. an electrovalve or a butterfly valve) placed anywhere on the vent pipe 22 in between the first end 23 and the second end connected to the suction device 24.

An embodiment could also combine the use of a valve within the vent pipe 22 and the use of a speed controller.

Unlike from what is taught in prior art, the cooling system 11 of FIG. 2 or 3 is activated during active regeneration of the particulate filter 8 arranged within the exhaust after treatment system compartment 6. In the embodiment of FIG. 2, the cooling system 11 includes a pipe 14 for blowing fresh air on the component to be cooled 10, while in the embodiment of FIG. 3, cooling system 11 includes a pipe 22 for extracting hot air present at the vicinity of the component to be cooled. Accordingly, only the component(s) 10 to be cooled is or are refreshed during active regeneration periods. This means that the other components, including the DPF 8, are not cooled. In other words, the component(s) 10 is (or are) protected as a priority against high temperatures during active regeneration periods. This is particularly advantageous because the DPF 8 must remain hot in order not to inhibit the regeneration.

In the two depicted embodiments, only one component 10 is cooled during regeneration periods. However, in a non-represented alternative embodiment, the process may consist in cooling two or more distinct components of the compartment 6. In such configuration, one air nozzle is provided for each component to be cooled, each air nozzle being oriented towards a respective component to be cooled. Alternatively, one vent pipe is provided for each component to be cooled, a first end of each vent pipe being located close to a respective component to be cooled.

In another non-represented alternative embodiment, at least one component to be cooled 10, preferably each component to be cooled, is encased in a protective housing arranged within the exhaust after treatment system compartment 6. In this particular embodiment, the end 12 of pipe 14 or the end 23 of pipe 22 enters in the protective housing provided around the component to be cooled.

The features of the two depicted embodiments and of non-represented alternative embodiments can be combined together to generate new embodiments of the invention.

The invention claimed is:

1. A process for cooling at least one component arranged within a compartment of an exhaust after treatment system of a vehicle, comprising:
   activating a cooling system of the exhaust after treatment system during active regeneration of one or more particulate filters arranged within the exhaust after treatment system compartment;
   extracting hot air present at a vicinity of the at least one component to be cooled to the cooling system with a suction device, so that the at least one component is protected as a priority against high temperatures during active regeneration periods;
   further comprising providing a vent pipe for each of the at least one component to be cooled, with a first end of the vent pipe being located close to a respective component to be cooled, and wherein the cooling system of the exhaust after treatment system is activated only during active regeneration of one or more particulate filters arranged within the exhaust after treatment system compartment.

2. The process according to claim 1, further comprising adjusting a flowrate of hot air extracted at the vicinity of each of the at least one component to be cooled.

3. The process according to claim 1, wherein the active regeneration includes introducing a small amount of fuel into an exhaust pipe of a vehicle engine.

4. The process according to claim 1, wherein the at least one component is a sensor.

5. The process according to claim 1, further comprising controlling a suction force generated by the suction device with the controller.

6. The process according to claim 1, wherein only the at least one component to be cooled is cooled by the suction device, and an exhaust gas within the exhaust pipe is maintained at high temperature for a depollution.

7. The process according to claim 1, wherein the at least one component is arranged near an exhaust pipe of the vehicle.

8. The process according to claim 1, wherein two or more distinct components of the compartment are cooled, wherein one vent pipe is provided for each component to be cooled, and wherein a first end of each vent pipe is located close to a respective component to be cooled.

9. An exhaust after treatment system for cooling at least one component arranged within a compartment of the exhaust after treatment system, comprising:
   a cooling system that is activated during the active regeneration of one or more particulate filters arranged within the exhaust after treatment system compartment and that includes a vent pipe connecting to a suction device, for extracting hot air present at a vicinity of the at least one component to be cooled to the cooling system with the suction device, so that the at least one component is protected as a priority against high temperatures during active regeneration periods,
   wherein each of the at least one component to be cooled is provided with the vent pipe whose first end is located close to a respective component to be cooled, and wherein the cooling system of the exhaust after treatment system is activated only during active regeneration of one or more particulate filters arranged within the exhaust after treatment system compartment.

10. The exhaust after treatment system according to claim 9, wherein the cooling system includes a valve for controlling a flowrate of hot air inside the vent pipe, the valve being in an open configuration during regeneration periods and in a closed configuration the rest of the time.

11. The exhaust after treatment system according to claim 10, wherein the valve is a proportional valve.

12. The exhaust after treatment system according to claim 9, wherein the vent pipe has a second end connected to the suction device.

13. The exhaust after treatment system according to claim 9, wherein the controller controls a suction force generated by the suction device.

14. The exhaust after treatment system according to claim 13, wherein the controller controls a flowrate of hot air extracted at the vicinity of the at least one component to be cooled.

15. The exhaust after treatment system according to claim 9, wherein the at least one component to be cooled is encased in a protective housing arranged within the exhaust after treatment system compartment.

16. The exhaust after treatment system according to claim 15, wherein an end of the vent pipe enters in the protective housing provided around the component to be cooled.

17. A vehicle, comprising the exhaust after treatment system according to claim 9.

18. The exhaust after treatment system according to claim 9, wherein only the at least one component to be cooled is cooled by the suction device of the cooling system, and an exhaust gas within the exhaust pipe is maintained at high temperature for a depollution.

19. The exhaust after treatment system according to claim 9, wherein the at least one component is arranged near an exhaust pipe of the vehicle.

20. A process for cooling at least one sensor or actuator component arranged within a compartment of an exhaust after treatment system of a vehicle, the compartment encasing at least one particulate filter, the process comprising:
  activating a cooling system of the exhaust after treatment system during active regeneration of the at least one particulate filter arranged within the exhaust after treatment system compartment;
  extracting hot air present at a vicinity of the at least one sensor or actuator component to be cooled to the cooling system with a suction device, so that only the at least one sensor or actuator component to be cooled is refreshed during active regeneration periods and the at least one particulate filter remains hot;
  providing a vent pipe for each of the at least one sensor or actuator component to be cooled, with a first end of the vent pipe being located close to a respective at least one sensor or actuator component to be cooled, and wherein the cooling system of the exhaust after treatment system is activated only during active regeneration of one or more particulate filters arranged within the exhaust after treatment system compartment.

21. The process according to claim 20, wherein two or more sensor or actuator components are cooled, wherein one individual vent pipe is provided for each sensor or actuator to be cooled, and wherein a first end of each individual vent pipe is located close to a respective sensor or actuator to be cooled.

\* \* \* \* \*